T. M. POWEL.
Ice Cream Freezer.
No. 11,651.  Patented Sept. 5, 1854.
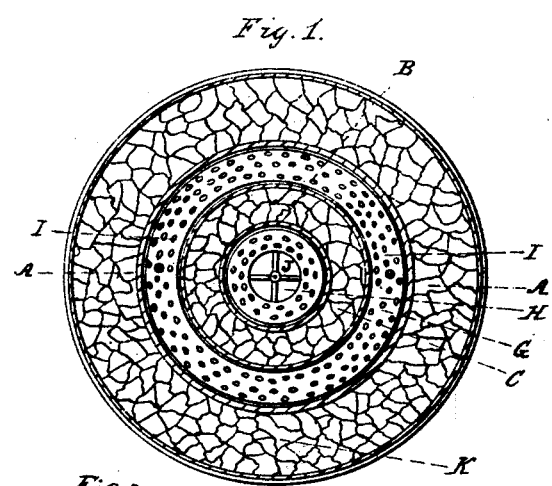
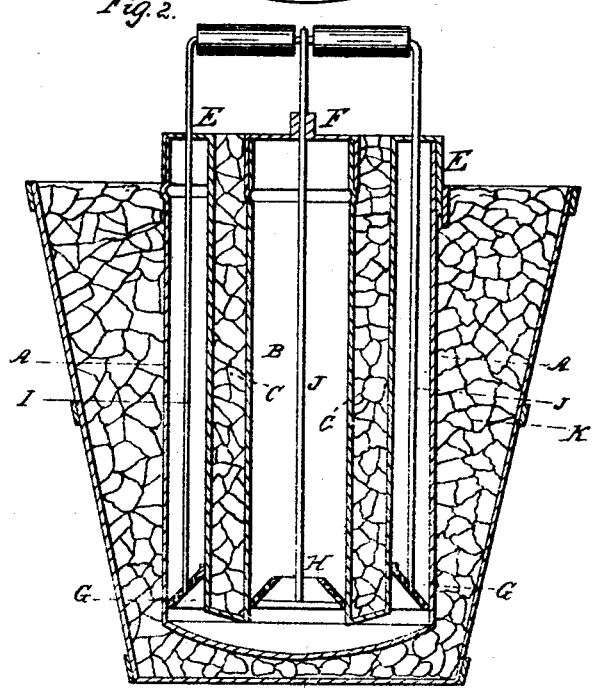

UNITED STATES PATENT OFFICE.

THOMAS M. POWELL, OF BALTIMORE, MARYLAND.

ICE-CREAM FREEZER.

Specification of Letters Patent No. 11,651, dated September 5, 1854.

*To all whom it may concern:*

Be it known that I, THOMAS M. POWELL, of Baltimore, State of Maryland, have invented a new and useful Improvement in Ice-Cream Freezers; and I do hereby declare that the following is a full, clear, and exact description of the same, reference being had to the accompanying drawings, forming part of this specification, in which—

Figure 1, is a horizontal section of one of my improved freezers. Fig. 2, is a vertical central section of the same.

Similar letters of reference indicate corresponding parts in each of the two figures.

The nature of my invention consists in constructing ice cream freezers with three cylindrical chambers—two of which—the center and outer ones serving for the cream, and the intermediate one for the ice. By thus constructing the freezer, and surrounding it with ice, and filling the intermediate chamber with the same, the cream will be exposed to three freezing surfaces instead of two, as in other freezers, and will be more speedily and effectually frozen than by other freezers in use.

To enable others skilled in the art to make and use my invention, I will proceed to describe its construction and operation more minutely.

A, in the accompanying drawing, represents the outer cream cylinder; B, is the inner or central cream cylinder; and C, the intermediate ice chamber or cylinder. The cylinder, A, is made separate from those, B, C, and is made in the ordinary manner. Those, B, C, are united together by the plate which forms the bottom of the intermediate ice cylinder; and B, is made open at the bottom, so as to communicate with the outer cream cylinder, A, and to receive the cream as it is poured into the cylinder, A, and admit of it coming in contact with the freezing surface of the chamber, C; and C, is open at the top, so as to receive the ice, as shown in the drawing.

E, is the top of the cylinder, A; it is attached fast to the ice cylinder, C, and is lifted off the cylinder, A, when said ice cylinder and the central cream cylinder are raised out of the cream cylinder, A. F, is the top of the central cream cylinder.

G, H, are the reticulated funnel shaped agitators, arranged inside of the cylinders, A and B, I, I, and J, are wire rods attached to the agitators, and carried up through the tops of the cream cylinders, and connected together, and made to serve as a handle to raise the agitators, as shown in the drawings. K, represents the ordinary ice tub, in which the freezer is placed.

By examining the drawing, Fig. 1, the manner in which the cream is exposed to the three freezing surfaces of the cylinders, A, B, and C, will be clearly seen; also the manner in which the agitators are arranged in the cylinders.

The operation of this freezer, is as follows:—The cream being placed in the cylinder, A, and said cylinder set in the ice tub, K, and the intermediate cylinder, C, filled with ice, the agitators are gradually worked up and down by the handles, I, I, and J: this operation lightens the cream, and removes the cream congealed from the surface of freezer to which it is exposed, and thus gives place to that in a liquid state, and thus the operation is carried on until the cream is perfectly frozen, which takes place in a very short time, owing to the congealed cream being displaced, and the uncongealed allowed to take its place. After the cream has been exposed to the freezing surface a suitable length of time, the inner cylinders are removed, and the cream covered up and set aside for about four minutes, when it will be fit for use.

What I claim as my invention, and desire to secure by Letters Patent, is:—

The manner herein described, and shown in the drawing, of constructing ice cream freezers, with three or more cylinders, A, B, C, arranged as described, for the purpose of more speedily and effectually freezing the cream, substantially as herein set forth.

THOMAS M. POWELL.

Witnesses:
M. HOFFMAN, Jr.,
JOHN A. SHRIVER.